United States Patent
McCaffrey et al.

(10) Patent No.: US 7,080,403 B2
(45) Date of Patent: Jul. 18, 2006

(54) METHOD AND SYSTEM FOR PERSON DATA AUTHENTICATION AND MANAGEMENT

(75) Inventors: Mary Ellen McCaffrey, Detroit, MI (US); Joseph Napoleon, Rochester Hills, MI (US); Melissa Loving, Troy, MI (US); Anne Root, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 683 days.

(21) Appl. No.: 09/993,221

(22) Filed: Nov. 19, 2001

(65) Prior Publication Data

US 2003/0105762 A1    Jun. 5, 2003

(51) Int. Cl.
  *G06F 7/04* (2006.01)
  *G06F 17/30* (2006.01)
  *G06K 9/00* (2006.01)
  *H04L 9/32* (2006.01)

(52) U.S. Cl. .............................. 726/2; 713/193; 707/2; 707/3; 707/5; 707/9; 235/379

(58) Field of Classification Search ................ 713/193; 707/3, 5, 2, 9; 235/379; 726/2
See application file for complete search history.

(56) References Cited

U.S. PATENT DOCUMENTS 6,532,459 B1 *   3/2003   Berson ........................... 707/3
6,581,059 B1 *   6/2003   Barrett et al. ................... 707/9
2001/0034733 A1 * 10/2001 Prompt et al. ............... 707/102
2002/0099701 A1 *  7/2002 Rippich .......................... 707/5
2002/0113122 A1 *  8/2002 Brikho ........................ 235/379
2003/0065649 A1 *  4/2003 Lucas et al. .................... 707/3
2003/0097451 A1 *  5/2003 Bjorksten et al. ........... 709/228

OTHER PUBLICATIONS

Sheu et al., 'A New Architecture for Integration of CORBA and OODB', Sep. 1999, IEEE transactions on knowledge and data engineering, vol. 11 No. 5, p. 748.*

* cited by examiner

*Primary Examiner*—Christopher Revak
*Assistant Examiner*—Shin-Hon Chen
(74) *Attorney, Agent, or Firm*—Ralph E. Smith

(57) ABSTRACT

A person authentication system for authenticating core person data to a plurality of unrelated database systems and virtually linking the plurality of unrelated database systems thus creating a person data repository is provided. A controller module is connected to the person data repository for applying business rules to the input and modification of the core person data. An access control module connected between a user interface of any one of the plurality of unrelated databases systems and the controller module monitors for the input, query or modification of core person data and imposes the business rules on any input, query or modification of the core person data. An authentication module connected to the controller module authenticates as unique the addition of a person to the person data repository.

11 Claims, 5 Drawing Sheets

(Prior Art Legacy System)

METHOD AND SYSTEM FOR PERSON DATA AUTHENTICATION AND MANAGEMENT

FIELD OF THE INVENTION

The present invention relates generally to computerized database management systems. More particularly, the present invention relates to a virtual relational database system directed to authenticating and maintaining person data.

BACKGROUND OF THE INVENTION

A challenge for any organization is the maintenance of person data for all persons that come into contact with the organization including employees and others. The challenge is compounded when the organization is large with multiple locations and multiple legacy systems that are in place to track different components of person data. Issues related to security, employment status, payroll and taxes are a few of the many areas that make person data authentication and management important.

Most organizations have contact with several "person types" including employees, non-employees, dependents of employees, visitors, temporary employees and contractors. Data for each person type may be input and maintained in a specific system for issues pertaining to the particular person type. For example, systems devoted to maintaining data related to employees are common. These systems however may not offer the ability to track and maintain data for non-employees or visitors. Further, organizations with legacy systems or systems in place in more than one location may not have a capability to share data between systems.

It is also true that the relationship between a person and organization can change over time such that the person type changes. For example, a contract employee can become a full time salaried employee. An employee can transfer from one location to another. A terminated employee can attempt to apply at another location of the organization. Each of these examples demonstrates the need for a system that will track all person types and provide a universal system for maintaining person data throughout the organization.

Further, data integrity is an issue when an organization relies on more than one system to maintain person data. Many organizations maintain several systems for managing person data. While each prior art system serves its own specialized purpose, together they create redundant data and in some instances inaccurate data. For example a person identified in one system may not match data in another system due to a misspelling of the name or a change in address. Therefore there is a need for a system to authenticate persons to an organization that will work across system platforms including legacy systems.

A related issue is the method for uniquely identifying and managing person data. Typical prior art systems require a unique tax identifier such as a social security number to uniquely identify an individual and therefore authenticate the person to the organization. A unique identifier may not be available, if for example the person is a non-employee or from a foreign country where no social security or similar tax identifier exists. Therefore, there is a need for a system that will authenticate a person to an organization that does not require a tax identifier or other assigned number for purpose of authentication.

Another important issue is the implementation of business rules to guide the modification of person data for the entire organization. In order to maintain integrity of the person data, certain rules must be in place to limit the ability of a person to input or modify core person data. This core person data, including name and other identifying information such as birth date, should be protected throughout all systems for the organization. For example, someone accessing person data through one system intended for limited application should not be able to destroy core person data created on another system. Further, the system intended to manage core person data should have greater freedom to modify this data.

Therefore, there is a need for a system to establish and manage a repository for global and commonly used core person data. A system is required that will authenticate person data to the entire organization while allowing for continued use of various prior art systems including legacy systems in place to accommodate specific requirements such as personnel systems. This improved system should not require a social security number or other uniquely assigned number for authentication.

For a more complete understanding of the invention, its objects and advantages refer to the following specification and to the accompanying drawings.

SUMMARY OF THE INVENTION

In accordance with the invention a person authentication system is provided for authenticating core person data to a plurality of unrelated database systems and virtually linking the plurality of unrelated database systems thus creating a person data repository. The person data repository contains data for all persons requiring visibility to the organization. Visibility applies to all persons that should be known by the organization in one capacity or another. The organization can extend (or not extend) visibility through the person authentication system to employees, non-employees, visitors, contractors, and others.

A controller module is connected to the person data repository for applying a set of business rules to the input and modification of the core person data. The controller module through the business rules maintains the integrity of the core person data.

An access control module is connected between a user interface of any one of the plurality of unrelated database systems and the controller module. The access control module monitors for any input, querying or modification of the core person data and imposes the business rules when an input, query or modification is made.

An authentication module is connected to the controller module for authenticating as unique the addition of a person to the person data repository. The authentication module eliminates redundancies in the person data repository.

In operation, a user attempting to input new person data into the person authentication system through a connected database system for example, a legacy employee database system will be forced to first authenticate the person. Once the new person is determined to be unique to the person data repository the core person data for the person is saved in the person data repository. Once in the person data repository the core person data will be used to further authenticate person data entered into the person authentication system by any other database system connected to the person authentication system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
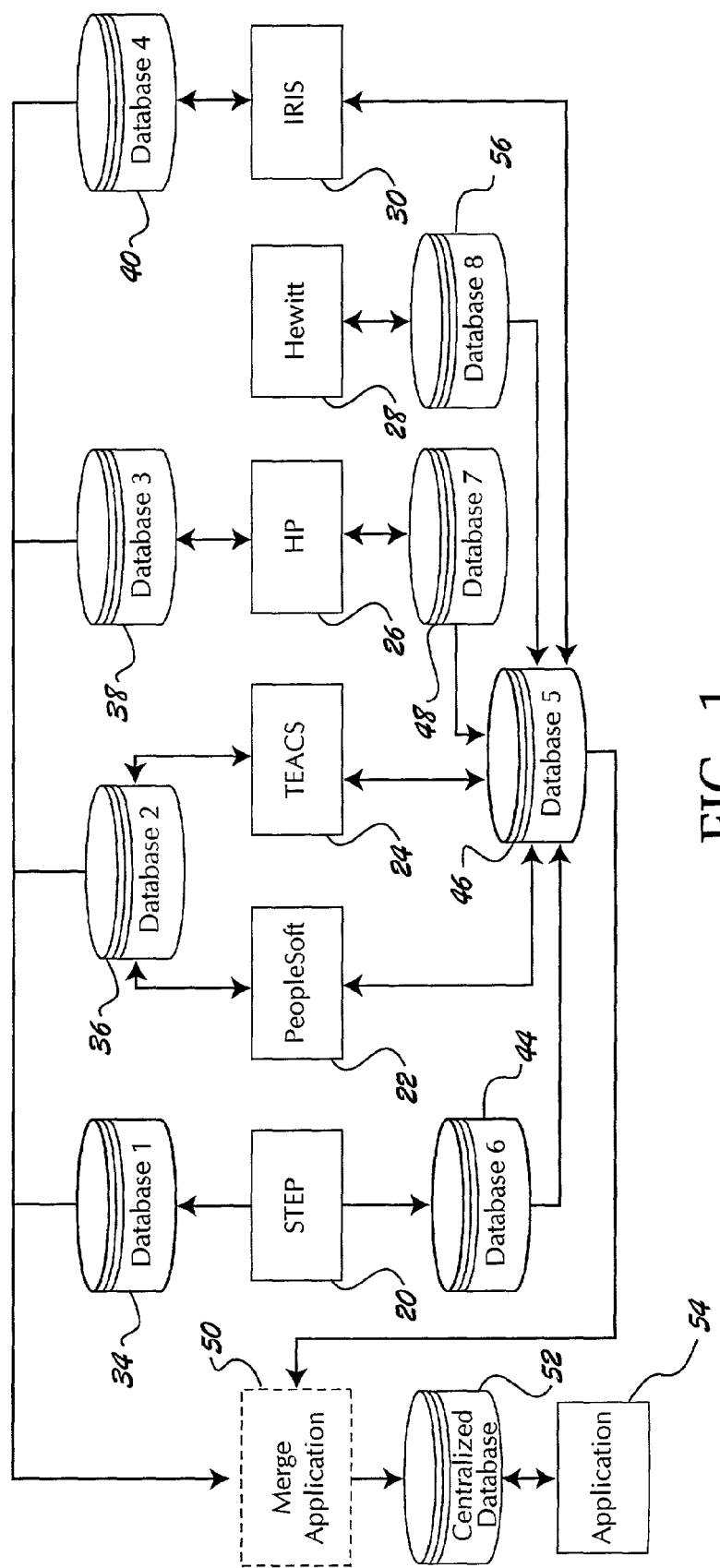
FIG. 1 is a block diagram illustrating a person authentication process in a prior art legacy system.

FIG. 1 illustrates a typical prior art legacy system for maintaining person data. A plurality of database applications 20, 22, 24, 26, 28, 30 representing different systems on different platforms correspond with a plurality of connected databases 34, 36, 38, 40, 44, 46, 48, 56. Each database application serves its own purpose in the organization. As an exemplar database application, a PeopleSoft® application 22 is used to manage data for salaried employees. The PeopleSoft® application 22 is separate from and generally manages its data independently from the other database applications. For example, a second exemplar database application, an HP™ system 26 manages data related to temporary employees independently of the PeopleSoft® application 22.

While some database applications, for example, the PeopleSoft® application 22, and the TEACS™ application 24 share a common database 36, most of the database applications do not. A merge application 50 compiles the data taken from the plurality of applications and databases into a centralized database 52. This consolidation is done on a batch basis since the plurality of database applications do not interact on a real time basis. This prior art legacy system does not provide the ability to easily verify or authenticate whether a person already exists in any system through any one of the other database systems.

Figure 2:
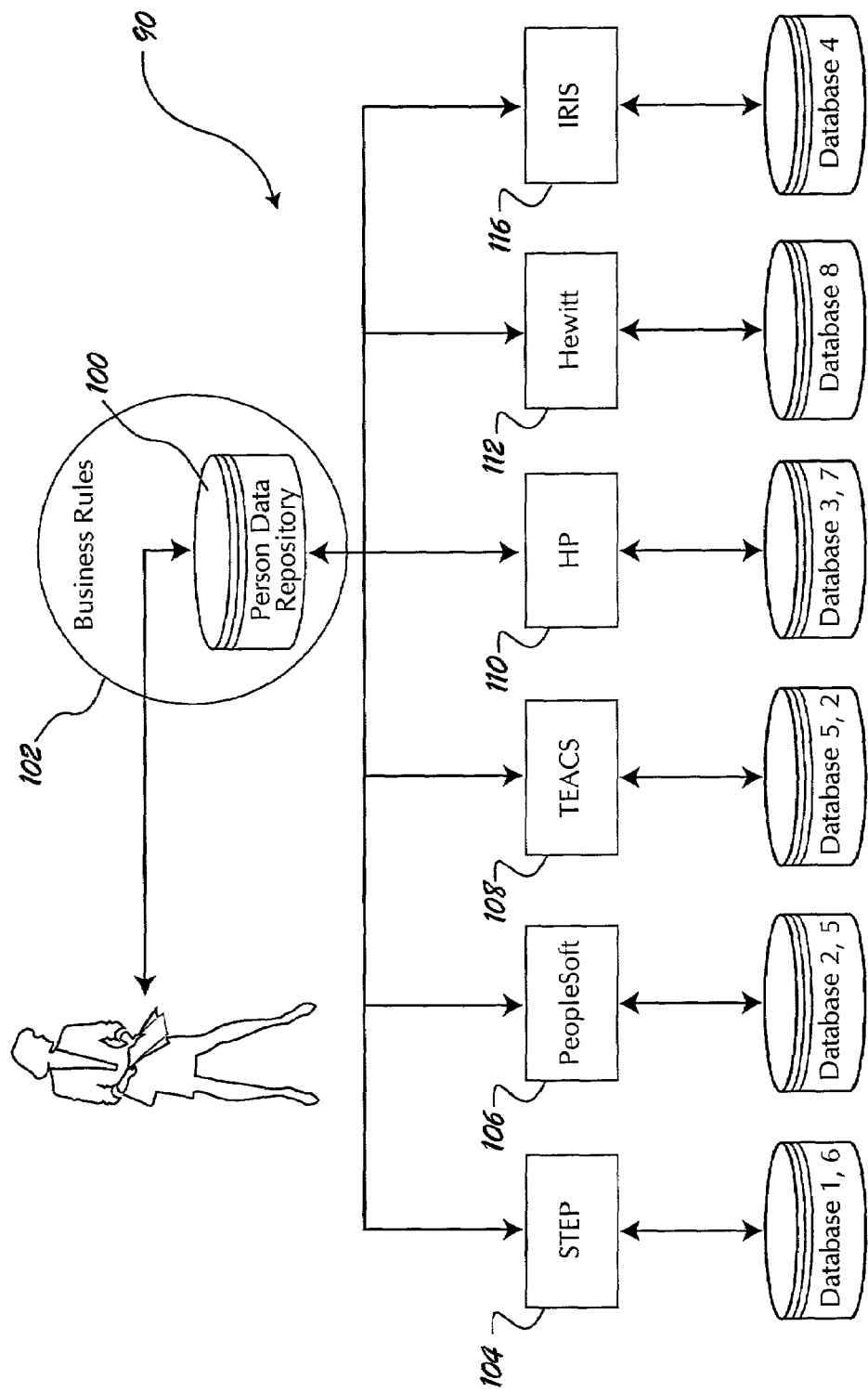
FIG. 2 is a block diagram illustrating an overview of the invention.

As an overview, in FIG. 2, the person authentication system 90 of the invention is illustrated incorporating the prior art legacy systems of FIG. 1. A person data repository 100 comprising core person data is protected by a set of business rules 102 that require the authentication of the core person data before it is saved in any one of the plurality of legacy database systems 104, 106, 108, 110, 112, 114, 116 that comprise the person data repository 100. The business rules 102 also serves the function of limiting the access to and modification of core person data by any one of the plurality of legacy database systems 104, 106, 108, 110, 112, 114, 116.

Figure 3:
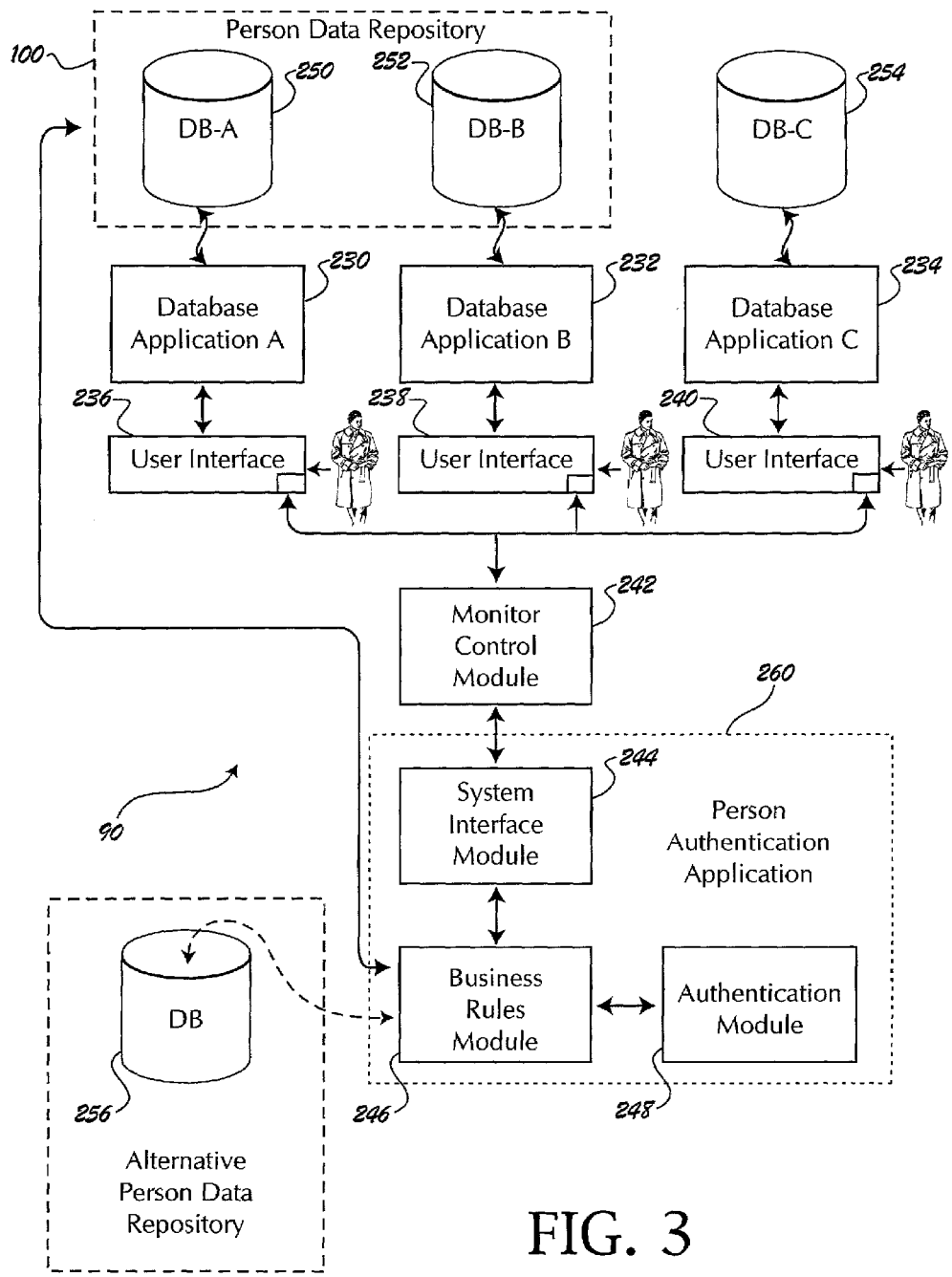
FIG. 3 is a block diagram illustrating an embodiment of the invention.

Referring to FIG. 3, the person authentication system 90 of the invention comprises a plurality of database applications including a database application A 230, database application B 232, and database application C 254 (in generic reference to legacy database systems) with corresponding databases attached including database A (DB-A) 250, database B (DB-B) 252, and database C (DB-C) 254. Each of the plurality of database applications 230, 232, 254 has its own user interface 236, 238, 240 allowing for the input and modification of data going into the corresponding databases 250, 252, 254.

The user interfaces 236, 238, 240 interact with a monitor control module 242. The monitor control module 242 monitors for any attempt to input, query or modify core person data. The monitor control module 242 can be implemented as a memory resident utility that is apart from the user interface it monitors. In this embodiment the monitor control module 242 is transparent to the user until it is activated by an attempt to query, input, or modify core person data in any one of the plurality of database applications 230, 232, 234. Alternatively, the monitor control module 242 can be implemented as a modification of the user interface 236, 238, 240 such that the monitor control module 242 is at least in part embedded into the application programming for each one of the plurality of database applications 230, 232, 234 it is intended to monitor. When the monitor control module 242 detects an attempt to query, input or modify core person data a person authentication application 260 of the invention authenticates the core person data.

Within the person authentication application 260 a system interface module 244 is connected to the monitor control module 242. The system interface module 244 converts a request from the protocol of the database application 230, 232, 234 monitored into a protocol understood by the person authentication application 260. The gateway formed by the system interface module 244 can be implemented by programming a translation between the different systems. Alternatively, the system interface module 244 can use a standardized gateway such as offered by the Common Object Request Broker Architecture (CORBA®). CORBA® allows interoperability between applications on different machines in heterogeneous distributed environments.

The system interface module 244 is connected to a business rules module 246 of the person authentication application 260. The business rules module 244 contains a set of rules for limiting the modification, input, and querying of core person data. The business rules in the business rules module 242 are contextually based on the particular database application calling upon the person authentication application 260. For example, the business rules can be set to allow only one system to enter certain components of the core person data or to prevent another system from deleting certain core person data. The business rules can also establish an ownership parameter to prevent deletion or modification of core person data by a system other than the one that was used to input the data originally.

The person data repository 100 comprises one or more databases that contain the core person data. The person data repository 100 can include one or more databases 250, 252 used by the database applications for example database application A 230, and database application B 232. An alternative person data repository 256 can be separate from the plurality of database applications 250, 252, 254 or in combination with the person data repository 100 comprising databases of the plurality of database applications 230, 232, 234.

If any of the database application systems are used to input a new person into their respective databases, the business rules module 246 will call upon an authentication module 248 to check if the person has already been entered into the person data repository 100. The authentication module forces the system user to confirm that the person to be entered into the person authentication system 90 is unique to the person data repository 100.

Figure 4:
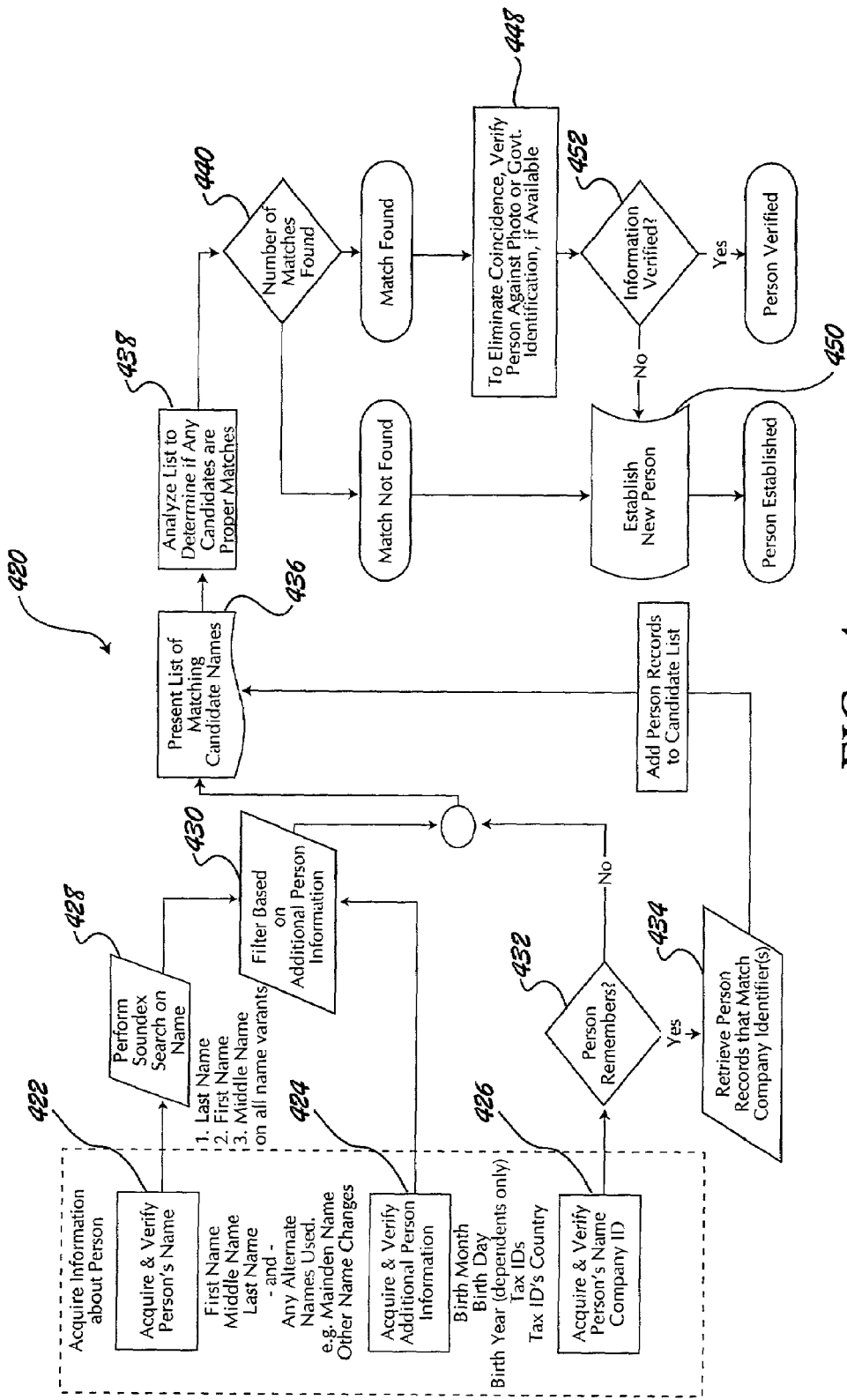
FIG. 4 is a flowchart illustrating an authentication process with respect to person data authentication of the invention.

Referring to FIG. 4, the authentication process 420 performed by the authentication module 248 is illustrated in greater detail. The authentication process 420 is required whenever an attempt is made to add data about a person who does not already exist in the person data repository 100. The purpose of the authentication process 420 is to validate as unique any attempt to add a person to the person data repository 100. The authentication process 420 forces the system user intending to add a person to review possible duplicate records in the person data repository 100 and make a determination if the person already exists in the person data repository 100.

First, information is acquired about an individual as in step 422, including the person's name and birth day and month. Alternatively, if available, in step 424 the person's tax identification data (e.g. social security number) can be received (but is not required) or in step 426 a company identification number can be received. When the data presented includes the name and birth information, then a search is performed in step 428 on the person data repository 100 to check if the same name is already there. The search can be a simple as listing ten names of persons with the first three letters of their last name matching the first three letters of the person's name entered. The search in step 428 can be performed using the Soundex algorithm or other algorithm designed to match the person's name entered with similar sounding variations in order to account for possible misspellings. Step 428 can also include a number of other techniques to match the input of name data with names already existing in the person data repository 100.

Based upon the amount of information presented, a filter in step 430 is used to make further matches with the input information and the data already in the person data repository 100. The filter in step 430 can include matches based on tax or company identification information. As illustrated in step 432 if the person can recall a previously assigned company identification number then records for the person are retrieved with this information in step 434.

After information is received about a person in either of steps 422, 424 or 426 then a search is performed on the person data repository 100 and in step 436 a list of potential matches are presented to the system user. Next, in step 438 the system user must analyze the list of potential matches to determine if any are a proper match. In step 440 if it is determined that there are no matches then in step 450 a new person can be established in the person data repository 100. If a match is found in step 440 then the system user must further verify the identity of the individual as the one already existing in the person data repository 100 in step 448. If the person is not verified then a new person is established in the person data repository 100 in step 450. Alternatively, the person is verified in step 452 as already existing in the person authentication system 90.

Figure 5:
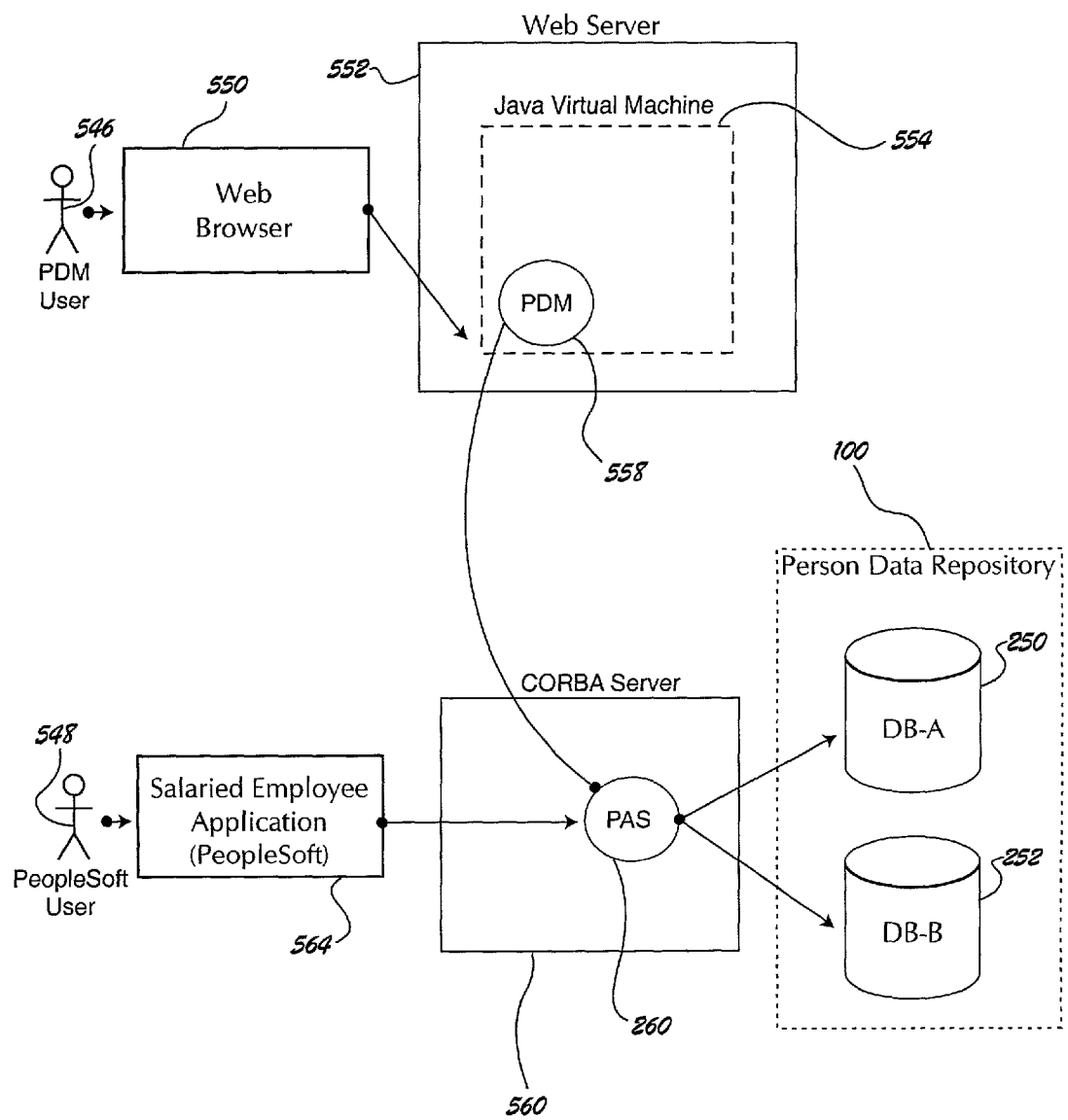
FIG. 5 is a block diagram illustrating an embodiment of the invention for implementation in a client-server environment.

Referring to FIG. 5 an embodiment of the invention is implemented in a client-server environment illustrating two methods of connecting to the person authentication system 90 to access the person data repository 100. First, a person authentication system 90 user 546 accesses the person data repository 100 from a workstation 550 through a web browser such as Netscape Navigator™ or Internet Explorer™. The workstation 550 is connected to a web server 552 running a Java virtual machine 554 and containing a person data management application 558. The person data management application 558 allows for directly connecting to the person data repository 100 independently of any other database system. The person data management application 558 is connected to a CORBA® server 560 containing the person authentication application 260. The person authentication application 260 is connected to the person data repository 100 comprising database A (DB-A) 250 and database B (DB-B) 252.

Access to the person data repository 100 through a third-party database application (legacy system) is also illustrated. A system user for example a PeopleSoft® user 548 can access the person authentication application 260 directly through a database application, for example, a salaried employee database application such as PeopleSoft® 564. A CORBA® server 560 is used to interface between the third-party database application (PeopleSoft®) and the person data repository 100 through the person authentication application 260.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer-implemented system for virtually linking a plurality of unrelated database systems, authenticating core person data input into said plurality of unrelated database systems, and managing through business rules said core person data, the system comprising:

a person data repository for storing the core person data for all persons requiring visibility in any one of said plurality of unrelated database systems wherein said core person data comprises a person name and birth date identifier;

a controller module connected to said person data repository and arranged to apply a set of business rules for restricting access, input, and modification of said core person data by said plurality of unrelated database systems;

an access control module connected between user interfaces of each of said plurality of unrelated database systems and said controller module wherein said access control module monitors said user interfaces for input, querying or modification of said core person data and imposes said business rules when an attempt is made to input, query or modify said core person data, thereby controlling access to the person data repository from any of the plurality of unrelated database systems; and an authentication module connected to said controller module for authenticating as unique the addition of a person to said core person data by the person name and birth date identifier;

whereby said core person data is authenticated and maintained for said plurality of unrelated database systems as a virtual relational database of the core person data.

2. The system of claim 1 wherein said person data repository comprises a database of said core person data coupled to said controller module.

3. The system of claim 1 wherein said person data repository comprises a relational database comprising at least a subset of databases associated with said plurality of unrelated database systems.

4. The system of claim 1 wherein said authentication module utilizes a search algorithm to determine if said person exists in said person data repository wherein said search algorithm attempts to match said person's name, birth month and birth day with names and birth data already in the person data repository.

5. The system of claim 4 wherein said search algorithm performs a Soundex search of the name of said person.

6. The system of claim 1 wherein said business rules comprise a set of contextual rules for allowing and/or disallowing the access, input, and modification of a component of said person data in said person data repository by a user of any of the plurality of unrelated database systems.

7. The system of claim 1 wherein said access control module comprises a program that is resident in memory containing said user interface for said plurality of unrelated database systems but is apart from said user interface.

8. The system of claim 1 wherein a system interface at each of the plurality of unrelated database systems is coupled to said access control module, said system interface creating a gateway between each of said plurality of unrelated database systems and said person data repository wherein said gateway translates a protocol of each of said plurality of unrelated database systems to a protocol necessary to access, query and modify said person data repository.

9. The system of claim 8 wherein said gateway is based on the CORBA®protocol.

10. A method for authenticating person data to a plurality of unrelated database systems comprising a plurality of databases, the method comprising:

provoding a person data repository for containing the person data for all persons requiring visibility in any of the plurality of unrelated database systems;

providing a controller module for monitoring user interfaces of each of the plurality of unrelated database systems for a request to input new person data into any one the plurality of unrelated database systems;

providing an access control module comprising business rules for receiving a request to input the new person data from the controller module; and applying the business rules of the access control module to restrict the input of the new person data into the plurality of databases if the new person data matches person data already existing in the plurality of databases;

whereby the person data is authenticated to the plurality of unrelated database systems.

11. The method of claim 10 wherein the person data repository comprises at least a subset of the plurality of databases.

* * * * *